(12) United States Patent
Dahmer et al.

(10) Patent No.: US 11,639,616 B2
(45) Date of Patent: May 2, 2023

(54) LOCKING DEVICE HAVING SHAPE MEMORY ALLOY FOR AN ENERGY STORAGE DEVICE OF A MOTOR VEHICLE AND METHOD FOR OPERATING SUCH A LOCKING DEVICE

(71) Applicant: Bayerische Motoren Werke Aktiengesellschaft, Munich (DE)

(72) Inventors: Johannes Dahmer, Munich (DE); Andre Lajtkep, Kirchheim (DE); Martin Peteratzinger, Munich (DE); Simon Schoenleber, Schwabhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 965 days.

(21) Appl. No.: 16/420,454

(22) Filed: May 23, 2019

(65) Prior Publication Data

US 2019/0277060 A1 Sep. 12, 2019

Related U.S. Application Data

(63) Continuation of application No. PCT/EP2017/076036, filed on Oct. 12, 2017.

(30) Foreign Application Priority Data

Nov. 25, 2016 (DE) ...................... 10 2016 223 446.3

(51) Int. Cl.
*E05B 47/00* (2006.01)
*B60L 53/16* (2019.01)
(Continued)

(52) U.S. Cl.
CPC .......... *E05B 47/0009* (2013.01); *B60L 53/16* (2019.02); *B60L 53/18* (2019.02);
(Continued)

(58) Field of Classification Search
CPC ..... Y02T 10/70; Y02T 10/7072; Y02T 90/12; Y02T 90/14; B60L 53/16; B60L 53/18;
(Continued)

(56) References Cited

U.S. PATENT DOCUMENTS 5,350,312 A * 9/1994 Kuno .................. H01R 13/635
439/372
6,374,608 B1 * 4/2002 Corris ..................... F03G 7/065
60/527
(Continued)

FOREIGN PATENT DOCUMENTS

CN 102917904 A 2/2013
CN 103038083 A 4/2013
(Continued)

OTHER PUBLICATIONS

Chinese-language Office Action issued in Chinese Application No. 201780072705.6 dated Dec. 24, 2021 with English translation (17 pages).

(Continued)

*Primary Examiner* — Mark A Williams
(74) *Attorney, Agent, or Firm* — Crowell & Moring LLP (57) ABSTRACT

A locking device for an energy storage device of a motor vehicle, includes a locking element, which is adjustable based on a control signal, by an adjusting device between a locking position, in which the locking element engages with a latch receptacle, and a release position, in which the locking element is out of engagement with the latch receptacle. The adjusting device has an adjusting element made of a shape memory alloy. The shape change enables the locking element to be adjustable between the locking position and the release position.

14 Claims, 4 Drawing Sheets

(51) Int. Cl.
*E05B 83/28* (2014.01)
*F03G 7/06* (2006.01)
*B60L 53/18* (2019.01)
*E05B 81/04* (2014.01)

(52) U.S. Cl.
CPC .......... *E05B 83/28* (2013.01); *F03G 7/06* (2013.01); *F03G 7/065* (2013.01); *B60L 2270/32* (2013.01); *E05B 81/04* (2013.01); *E05B 2047/0086* (2013.01); *Y02T 10/70* (2013.01); *Y02T 10/7072* (2013.01); *Y02T 90/12* (2013.01); *Y02T 90/14* (2013.01)

(58) Field of Classification Search
CPC ...... B60L 53/00; B60L 53/34; B60L 2270/32; E05B 81/25; E05B 47/0009; E05B 81/90; E05B 2047/0086; E05B 83/28; E05B 81/04; H01R 2201/26; F03G 7/065; F03G 7/06
See application file for complete search history.

(56) References Cited

U.S. PATENT DOCUMENTS

| | | | | |
|---|---|---|---|---|
| 2012/0262115 | A1* | 10/2012 | Ichikawa | B60L 50/40 320/109 |
| 2013/0102163 | A1* | 4/2013 | Basavarajappa | B60L 53/68 310/67 R |
| 2013/0137286 | A1 | 5/2013 | Smith et al. | |
| 2013/0154402 | A1 | 6/2013 | Basavarajappa et al. | |
| 2015/0300058 | A1* | 10/2015 | Alexander | E05C 19/022 292/63 |
| 2017/0158068 | A1* | 6/2017 | Dowell | H02J 7/0045 |
| 2018/0076570 | A1 | 3/2018 | Huhmann et al. | |

FOREIGN PATENT DOCUMENTS

| | | | | |
|---|---|---|---|---|
| CN | 104411533 A | | 3/2015 | |
| DE | 10 2010 040 787 A1 | | 3/2012 | |
| DE | 10 2010 041 314 A1 | | 3/2012 | |
| DE | 10 2010 041 323 A1 | | 3/2012 | |
| DE | 102010041362 A1 | * | 3/2012 | .............. B60L 53/16 |
| DE | 102011004834 A1 | * | 8/2012 | .............. B60L 53/16 |
| DE | 10 2012 000 913 A1 | | 7/2013 | |
| DE | 102012023873 A1 | * | 6/2014 | .......... B60L 11/1818 |
| DE | 10 2013 110 428 A1 | | 3/2015 | |
| DE | 10 2015 004 808 B3 | | 7/2016 | |
| DE | 102015004808 B3 | * | 7/2016 | .......... H01R 13/514 |
| DE | 102017216783 A1 | * | 3/2019 | |
| JP | 61-177179 A | | 8/1986 | |
| WO | WO 2012/031586 A2 | | 3/2012 | |
| WO | WO 2013/071913 A2 | | 5/2013 | |

OTHER PUBLICATIONS

International Search Report (PCT/ISA/210) issued in PCT Application No. PCT/EP2017/076036 dated Jan. 15, 2018 with English translation (seven (7) pages).

German-language Written Opinion (PCT/ISA/237) issued in PCT Application No. PCT/EP2017/076036 dated Jan. 15, 2018 (seven (7) pages).

German-language Search Report issued in counterpart German Application No. 10 2016 223 446.3 dated Jun. 8, 2017 with partial English translation (15 pages).

Chinese-language Office Action issued in Chinese Application No. 201780072705.6 dated May 23, 2022 with English translation (17 pages).

* cited by examiner

LOCKING DEVICE HAVING SHAPE MEMORY ALLOY FOR AN ENERGY STORAGE DEVICE OF A MOTOR VEHICLE AND METHOD FOR OPERATING SUCH A LOCKING DEVICE

CROSS REFERENCE TO RELATED APPLICATIONS

This application is a continuation of PCT International Application No. PCT/EP2017/076036, filed Oct. 12, 2017, which claims priority under 35 U.S.C. § 119 from German Patent Application No. 10 2016 223 446.3, filed Nov. 25, 2016, the entire disclosures of which are herein expressly incorporated by reference.

BACKGROUND AND SUMMARY OF THE INVENTION

The invention relates to a locking device for an energy storage device of a motor vehicle. The invention further relates to a method for operating such a locking device.

Motor vehicles, in particular cars, have an energy storage device which can be designed, for example, as a tank and/or traction battery. The energy storage device can be charged from outside the car with an energy source, for example electrical current and/or a liquid or gaseous fuel, through a supply interface. Customarily provided at the supply interface is a device which prevents unauthorized operation of the supply interface.

For example, a locking actuator is known from the prior art, in particular from series vehicle construction, that is connected, for example, to a centrally controlled locking system of a motor vehicle, wherein a locking pin engages at least partially in a receptacle of a cover of the supply interface that is designed, for example, as a tank flap. The result is that the tank flap cannot be opened with the motor vehicle locked, whereby the supply interface is protected against unauthorized operation.

Furthermore, the prior art, in particular in the case of at least partially electrified motor vehicles, for example electric vehicles and/or plug-in hybrid vehicles, discloses a locking actuator which is used on a charging plug lock. The charging plug lock can be connected, for example, to charging electronics of the motor vehicle, wherein a locking pin engages at least partially in a receptacle of a charging plug arranged in the supply interface, which can be configured, for example, as a charging socket. The result is that the charging plug is firmly arranged in the charging socket during an, in particular unobserved, charging operation, whereby the charging plug is protected against unauthorized extraction from the charging socket.

A disadvantage with the above-stated locking actuators is firstly that such locking actuators require an installation space for an electric motor and a gear mechanism which are designed to displace the respective locking pin.

Secondly, there has to be provided a further installation space for a mechanical emergency unlocking device by which the supply device can be unlocked, in particular manually, for example in the case of a defect of the locking actuator. Such an emergency unlocking device can have a complex design and be failure-prone.

Thirdly, in the case of locking actuators based on an electric motor, the electric motor is blocked if the locking pin is blocked. This means that the electric motor is deactivated and the locking pin can remain arranged in an incorrect position, even if a reason for the blocking of the locking pin, for example a foreign object, an incompletely closed tank flap or a charging plug incorrectly inserted into the charging socket, is remedied.

It is an object of the invention to provide a locking device for an energy storage device of a car that is particularly favorable in terms of installation space.

According to the invention, there is accordingly provided a locking device for an energy storage device of a car, having a locking element which is adjustable, on the basis of a control signal, by way of an adjusting device, between a locking position, in which the locking element is in engagement with a locking receptacle, and a release position, in which the locking element is out of engagement with the locking receptacle.

In order, then, to provide a locking device for an energy storage device of a car that is particularly favorable in terms of installation space, the adjusting device has an adjusting element made of a shape memory alloy, the shape change of which makes it possible to adjust the locking element between the locking position and the release position.

In other words, the energy storage device of a motor vehicle, which particularly takes the form of a car, can have a supply interface through which the energy storage device can be charged from outside the car with at least one energy source. The locking device which includes the adjusting device is arranged in the region of the supply interface. The adjusting device is designed, on the basis of a control signal directed in a wireless and/or wired manner to the locking device, to be able to change the locking element from the locking position into the release position and from the release position into the locking position. If the locking element is arranged in the locking position, the locking element engages at least partially in the locking receptacle which corresponds to the locking element and which is arranged on a part of the supply interface, with the result that the supply interface is secured against unauthorized operation.

In order, then, to save installation space by comparison with conventional locking devices, that is to say to configure the locking device to be particularly efficient in terms of installation space, the adjusting element, which can also be referred to as an actuator, is manufactured from a shape memory alloy (SMA). The result is that the SMA adjusting element has a smaller installation space requirement as compared to a conventional adjusting element based, for example, on an electric motor.

SMA components, that is to say components made of a shape memory alloy, have a cold shape at a starting temperature, for example room temperature, and are reversibly deformable into a hot shape, which differs from the cold shape, by heating to a temperature which is higher than room temperature. This means that an SMA component which is heated, for example, by means of electric current and which has the hot shape is deformable into the cold shape by cooling at least substantially to room temperature.

The use of the SMA adjusting element means that the locking device according to the invention is configured to be particularly mass-efficient, since an actuator, which is based for example on an electric motor and which is intended for example to move the same mass as the SMA adjusting element, is heavier by a multiple than the SMA adjusting element.

By virtue of the fact that the SMA adjusting element is electrically conductive and has an electrical resistance which is dependent on the cold shape or hot shape, the SMA adjusting element can have a multifunctionality in which the SMA adjusting element is used, for example, as a sensor element. The result is that a sensor system which is used in a conventional locking device can be eliminated. This is particularly cost-efficient.

In a further advantageous embodiment of the invention, there is provision that, in an inoperative state, the locking device holds the locking element monostably in the release position by way of the adjusting element, wherein the locking element can be adjusted into the locking position on the basis of the control signal. In other words, the SMA adjusting element has assumed the cold shape in the inoperative state, wherein the locking element is out of engagement with the locking receptacle, that is to say that the locking element does not engage in the locking receptacle. The SMA adjusting element is deformable into the hot shape, wherein the locking element engages at least partially in the locking receptacle in that the locking device is activated, in particular progressively, for example by the control device with the control signal, which can be formed, for example, as an electric current. This means that an activation occurs for locking of the locking device. This offers the advantage that no energy has to be expended if the locking device is intended to be unlocked. Furthermore, in this embodiment, an, in particular separate, emergency unlocking device can be completely dispensed with, since the locking element remains arranged in the release position in its cold shape, i.e. when not activated, energized and/or heated. As a result, the locking device can be configured to be particularly efficient in terms of installation space, mass and cost.

In a further embodiment of the invention, it is advantageous that, in the inoperative state, the locking device holds the locking element monostably in the locking position by way of the adjusting element, wherein the locking element can be adjusted into the release position on the basis of the control signal. This means that, in the inoperative state, the SMA adjusting element has assumed the cold shape, wherein the locking element engages at least partially in the locking receptacle. The SMA adjusting element can be deformed into the hot shape, wherein the locking element is arranged outside the locking receptacle in that the locking device is activated, in particular progressively, for example by the control device with the control signal. This means that an activation occurs for unlocking the locking device. This offers the advantage that no energy has to be expended if the locking device is intended to be locked.

Furthermore, it has been found to be advantageous that, in the inoperative state, the locking device holds the locking element bistably in the release position and/or in the locking position by way of the adjusting device, wherein the locking element can be adjusted into the respective other position on the basis of the control signal. In other words, the locking element is held by the adjusting device respectively in the release position if the locking device is intended to be unlocked and in the locking position if the locking device is intended to be locked. This means that, on the basis of the control signal which is directed to the locking device and which is formed, in particular, as a control pulse, the locking element can be changed from the release position into the locking position or from the locking position into the release position by means of the adjusting device. It is advantageous here that no energy has to be expended if the locking device is locked or unlocked.

Furthermore, an electrical switching element, by means of which the locking device can be emergency-unlocked, can be provided on the locking device. In other words, for example a current circuit, which can include the SMA adjusting element, can be interrupted by means of the electrical switching element, which is configured for example as a switch or as a plug connection. The result is that the heated SMA adjusting element which has assumed the hot shape in which the locking device is locked can be cooled. Inter alia, the locking device is unlockable as a result. Alternatively or additionally, the initially interrupted current circuit which can include the SMA element can be able to be closed by means of the electrical switching element, with the result that an SMA adjusting element which has assumed the cold shape in which the locking device is locked can be heated. As a result, the locking device is likewise unlockable. Hence, the locking device can be unlocked in an emergency situation, for example. It is advantageous here that an installation space-intensive and failure-prone mechanical emergency unlocking device can be dispensed with, this, moreover, being cost-efficient.

Furthermore, a sensor system for determining the position of the manufacturing element can be provided on the locking device. In other words, the sensor system can be designed to output a first sensor value if the locking device is locked, that is to say if the locking element is arranged in the locking position. The sensor system can furthermore be designed to output a second sensor value if the locking device is unlocked, that is to say if the locking element is arranged in the release position. For example, the sensor system can include a first sensor element assigned to the locking position and a second sensor element assigned to the release position. Alternatively or additionally, the sensor system can include a measuring arrangement which is designed to measure an electrical resistance of the SMA adjusting element, wherein the electrical resistance of the SMA adjusting element, as described above, is dependent on whether the SMA adjusting element has assumed its hot shape or its cold shape. This offers the advantage that further-processable information on the position of the locking element can be made available which, for example, can be used to indicate, by means of an indicator, to a user of the motor vehicle in which position the locking element is currently arranged.

According to a further advantageous embodiment of the invention, the locking device can be provided for a plug connection of a charging plug with a charging socket of the energy storage device. This means that the locking device can be provided on an at least partially electrified motor vehicle, for example an electric vehicle and/or a plug-in hybrid vehicle. In this case, the locking device can be designed, for example, to releasably lock the charging plug in the charging socket, which offers the advantage that the charging plug is protected against unauthorized extraction from the charging socket.

It is further possible that the locking receptacle is arranged in the charging plug, the locking element being arranged on the charging socket. In other words, the locking device can be arranged vehicle-side, with the result that the locking element in the locking position can project, for example, from an opening in the charging socket. This means that the charging plug can have merely the locking receptacle corresponding to the locking element, whereby electrical or electronic components for controlling the locking device can be dispensed with on the charging plug, that is to say on a charging device which comprises the charging plug.

Furthermore, the locking element can be able to be plugged into the locking receptacle if the charging plug is received in the charging socket in a completely plugged-in plugging position. In particular, the locking device, the charging plug and/or the charging socket can be designed such that the locking element can be arranged merely in the locking receptacle when the charging plug is connected as intended to the charging socket. This offers the advantage that a situation can be prevented in which the locking element can be arranged into the locking position if, for example as a result of an incorrect operation, the charging plug is, for example, not arranged, only incompletely arranged or incorrectly arranged in the charging socket. Thus, for the user of the motor vehicle, a particularly simple operation of the charging plug and/or of the locking device can be ensured as compared with conventional locking devices.

The present invention further provides a method for operating a locking device for an energy storage device of a car, in which a locking element is adjusted, on the basis of a control signal, by way of an adjusting device, between a locking position, in which the locking element is in engagement with a locking receptacle, and a release position, in which the locking element is out of engagement with the locking receptacle. The locking element is adjusted between the locking position and the release position by a shape change of an adjusting element of the adjusting device that has a shape memory alloy. In other words, it is possible, for example, for a vehicle-side and/or supply-side control device to transmit a control signal in a wireless and/or wired manner to the locking device, which subsequently, by means of the adjusting device having the adjusting element, can change the locking element from the release position into the locking position and from the locking position into the release position. Here, the adjusting element has at least in part a shape memory alloy (SMA), with the result that the SMA adjusting element can reversibly assume at least two temperature-dependent shapes which are in each case different from one another. A shape change of the SMA adjusting element results in the locking element being arranged into the locking position or into the release position. This method offers the advantage that the energy storage device of the car is effectively protected against unauthorized operation.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical or functionally identical elements are provided with the same reference signs.

Figure 1:
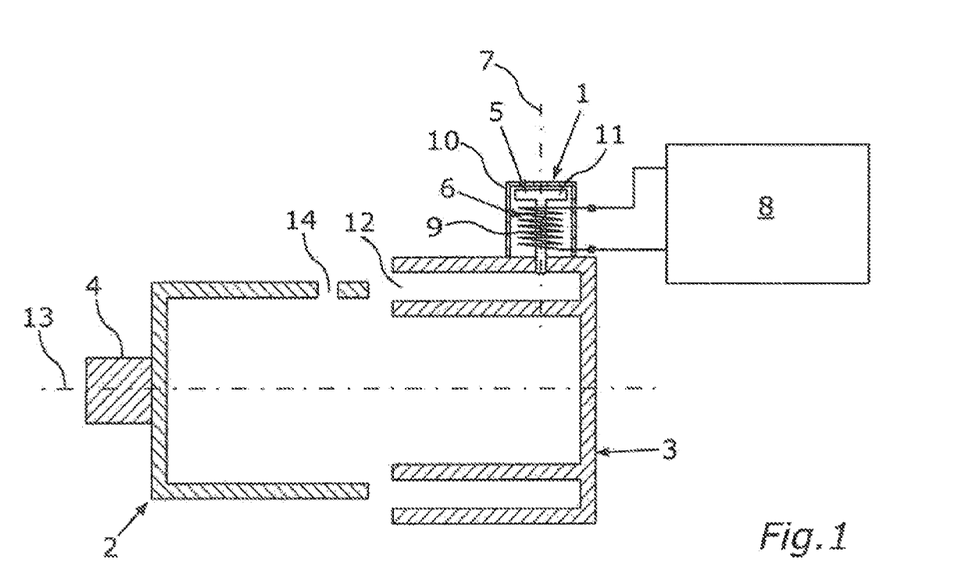
FIG. 1 is a schematic illustration showing an unlocked locking device for an energy storage device of a car that is provided, by way of example, on a plug connection of a charging plug with a charging socket.

FIG. 1 is a schematic illustration showing a locking device 1 for an energy storage device (not shown) of a car that is provided, for example, on a plug connection of a charging plug 2 with a charging socket 3. The charging plug 2 can be arranged, for example, at an end of a charging cable 4 in order to correspond with the charging socket 3, with the result that the energy storage device can be connected by means of the charging plug 2 to a supply device (not shown) which can be designed, for example, as a charge point of a charging station or as an external electricity network. It can also be seen in FIG. 1 that the locking device 1 comprises a locking element 5 which can be displaced along a longitudinal axis 7, i.e. axially, by means of an adjusting element which is designed, in particular, as a shape memory alloy adjusting element 6, which can also be referred to herein as SMA adjusting element 6. A control device 8 is connected to the SMA adjusting element 6, with the result that the SMA adjusting element 6 can be controlled by means of the control device 8. In particular, the control device 8 can be designed to direct a control signal to the locking device 1. The control signal can be formed, for example, as an electric current, with the result that the SMA adjusting element 6 designed, for example, as an SMA helical spring 9 is heated. The result is that the SMA adjusting element 6, by virtue of its operating principle, changes its shape. Thus, the SMA adjusting element 6 is capable of serving as an actuator by which the locking element 5 is displaceable along the longitudinal axis 7. For this purpose, the SMA helical spring 9 can be arranged between a wall of a housing 10 of the locking device 1 and a supporting portion 11 of the locking element 5. The result is that the SMA helical spring 9 in a cold shape, that is to say if the control signal to the locking device 1 ceases, holds the locking element 5 in a release position. In the release position, a plug-in region 12 of the charging socket 3 is freed by the locking element 5. The result is that the charging plug 2 can be inserted along a plug longitudinal axis 13 toward the charging socket 3 and into the charging socket 3 or can be extracted therefrom. Here, a longitudinal axis (not explicitly shown) of the charging socket 3 coincides with the plug longitudinal axis 13.

Figure 2:
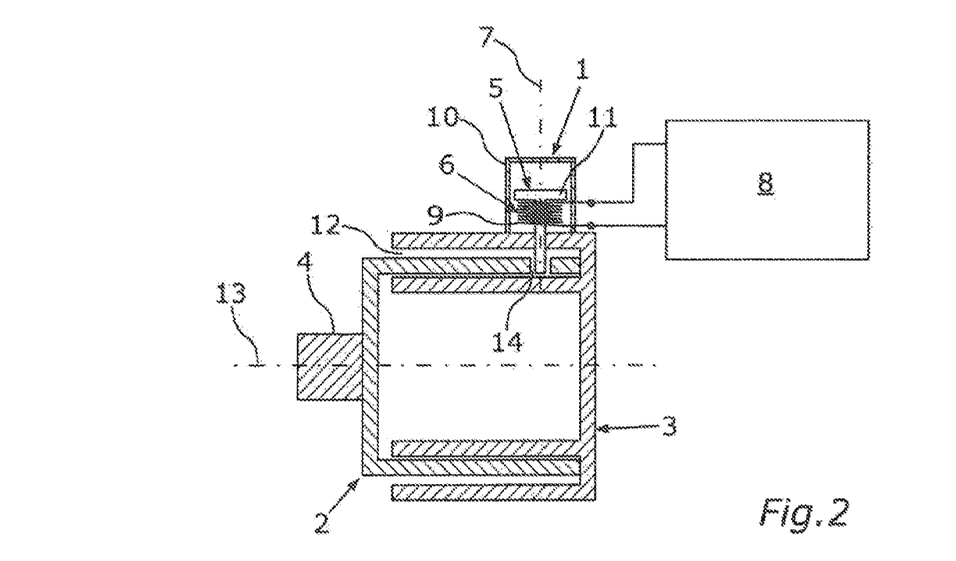
FIG. 2 is a schematic illustration showing the locking device from FIG. 1, wherein the locking device is locked as intended.

FIG. 2 is a schematic illustration showing the locking device 1 from FIG. 1, wherein the locking device 1 is locked as intended. This means that the charging plug 2 is arranged in the charging socket 3 as intended, i.e. is plugged in. This has the result that a locking receptacle 14 which can be formed on the charging plug 2 is arranged in the charging socket 3 such that a center axis (not explicitly shown) of the locking receptacle 14 coincides with the longitudinal axis 7. Thus, the locking element 5 is capable of engaging at least partially in the locking receptacle 14. The control device 8 can be designed to direct a control signal to the locking device 1, i.e. in particular to the SMA adjusting element. The control signal can be formed, for example, as an electric current, with the result that the SMA adjusting element 6, which is designed, for example, as an SMA helical spring 9, is heated in order to adopt a hot shape in which the SMA helical spring is compressed with respect to the longitudinal axis 7. As a result, the locking element 5 is axially displaceable. The result is that it engages at least partially in the locking receptacle 14, whereby the charging plug 2 plugged into the charging socket 3 is releasably locked in the charging socket 3. The fact that the charging plug 2 is locked in the charging socket 3 means that damage to contacts (not shown) of the charging plug 2 and/or of the charging socket 3 is prevented. Furthermore, unauthorized unplugging of the charging cable 4 is effectively prevented.

In one embodiment, the control signal is formed in such a way that it is applied to the locking device 1 for as long as the locking element 5 is intended to be arranged in the release position. This means that the locking element 5 is arranged in the locking position by means of the SMA adjusting element 6 which has assumed the cold shape and which is thus not activated by the control signal.

In a further embodiment, the control signal is formed in such a way that it is applied to the locking device 1 for as long as the locking element 5 is intended to be arranged in the locking position. This means that the locking element 5 is arranged in the release position by means of the SMA adjusting element 6 which has assumed the cold shape and which is thus not activated by the control signal.

Figure 3:
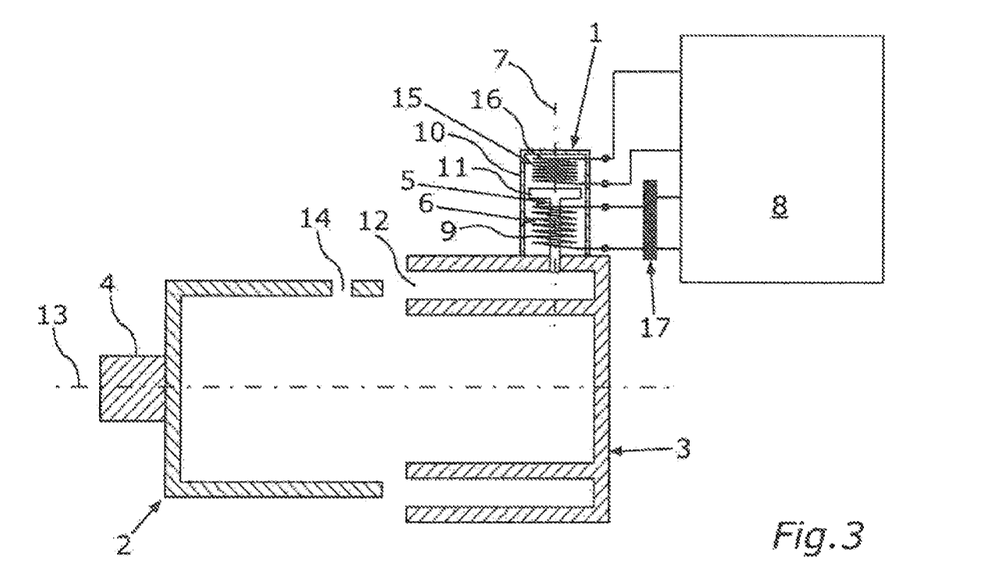
FIG. 3 is a schematic illustration showing a further embodiment of the locking device which is of bistable configuration and has an emergency unlocking device.

FIG. 3 is a schematic illustration showing a further embodiment of the locking device, which is configured to be bistable and has an emergency unlocking device. This means that the locking device 1 can have, for example, a further SMA adjusting element 15 which can be configured, for example, as a further SMA helical spring 16. The further SMA helical spring 16 can be arranged coaxially to the SMA helical spring 9 with respect to the longitudinal axis 7, wherein the further SMA helical spring 16 can be arranged between a further wall of the housing 10 and the supporting portion 11. Assuming that the locking element 5 is arranged in the release position, the SMA helical spring 9 in its cold shape, i.e. if the SMA helical spring 9 is not activated by means of the control signal, can be designed to hold the locking element 5 in the release position in that the SMA helical spring 9 is expanded axially with respect to the longitudinal axis 7. Here, the further SMA helical spring 16 in a further cold shape, i.e. if the further SMA helical spring is not activated by means of the control signal, can be designed to hold the locking element 5 in the release position in that the further SMA helical spring 16 is axially compressed with respect to the longitudinal axis 7.

The locking device 1 can be controlled by means of the control device 8 in that the control device 8 directs the control signal in particular to the further SMA helical spring 16, with the result that the further SMA helical spring 16 is heated, wherein the further SMA helical spring 16 assumes a further hot shape. By virtue of its operating principle, the further SMA helical spring 16 thus expands axially with respect to the longitudinal axis 7 in order to displace the locking element 5, under axial compression of the SMA helical spring 9, along the longitudinal axis 7 from the release position into the locking position. The SMA helical spring 9 and the further SMA helical spring 16 can each be of bistable configuration, i.e. they can be designed to retain their respective cold and/or hot shape without activation, with the result that, in this embodiment of the locking device 1, the control signal can be formed in particular as an electric control pulse which initiates a displacement of the locking element 5. A locking device 1 of such bistable configuration offers the advantage that energy has to be expended only when the displacement of the locking element 5 is intended to take place.

In order to displace the locking element 5 into the release position starting from the locking position, the SMA helical spring 9 can be activated by means of the control device 8 via the electric control pulse, wherein the SMA helical spring 9 is capable of assuming the hot shape in order to axially compress the further SMA helical spring 16 along the longitudinal axis 7 with respect to the longitudinal axis seven. As a result, the locking element 5 is axially displaceable from the locking position into the release position along the longitudinal axis 7.

FIG. 3 further shows an emergency unlocking device 17 which is designed to direct an emergency unlocking signal to the locking device 1 and in particular to one of the two SMA adjusting elements 6 and/or 15. For example, the emergency unlocking device 17 can be designed to direct the emergency unlocking signal to the SMA adjusting element 6, with the result that the SMA adjusting element 6 displaces the locking element 5 into the release position. The emergency unlocking signal 17 can be integrated in the control device 8; however, the emergency unlocking device 17 is preferably designed as an electrical switching element.

Figure 4:
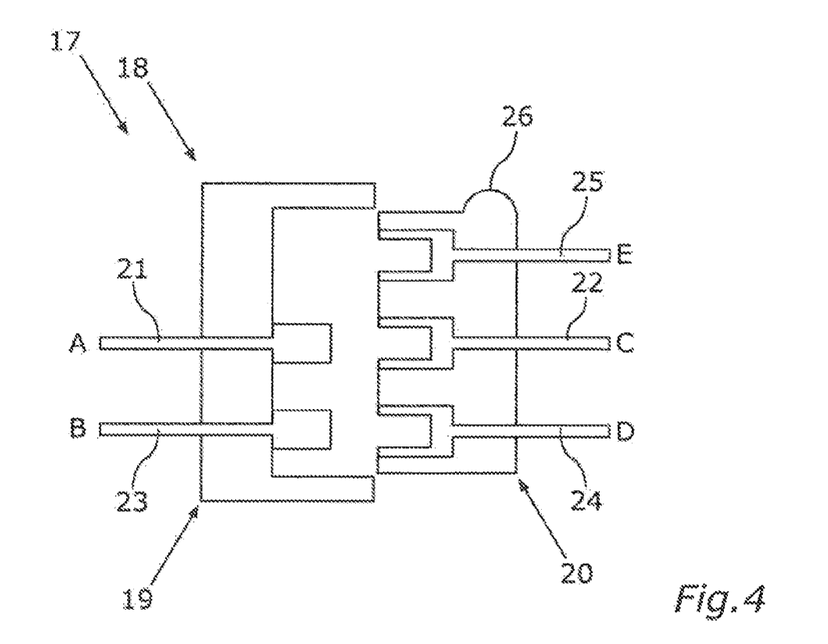
FIG. 4 is a schematic illustration showing an embodiment of the emergency locking device, in a normal state.

FIG. 4 is a schematic illustration showing an embodiment of the emergency unlocking device 17, in a normal state. Here, the emergency unlocking device 17 is designed as an emergency unlocking plug-socket pair 18 which comprises an emergency unlocking socket 19 and an emergency unlocking plug 20. For better clarity, the emergency unlocking plug-socket pair 18 is illustrated separately from one another. In the normal state, the contact A 21 and the contact C 22 and also the contact B 23 and the contact D 24 are connected to one another in an electrically conducting manner, with the result that the locking device 1 operates as intended, as described above. This means that a contact E 25 is electrically insulated from each of the other contacts present in the emergency unlocking plug-socket pair 18.

Figure 5:
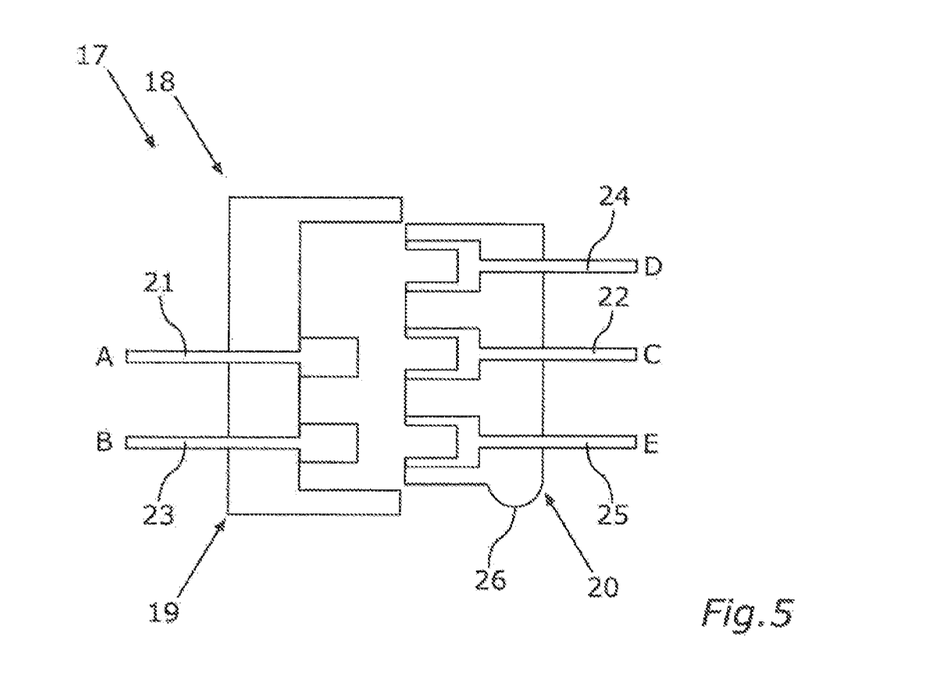
FIG. 5 is a schematic illustration showing the emergency locking device from FIG. 4, in an emergency unlocking state.

FIG. 5 is a schematic illustration showing the emergency unlocking device from FIG. 4, in an emergency unlocking state. This means that, if the charging plug 2 locked in the charging socket 3 is intended to be extracted from the charging socket 3 as quickly as possible, in particular in an emergency situation, the emergency unlocking plug 20 is extracted from the emergency unlocking socket 19 and is re-inserted into the emergency unlocking socket 19 by being rotated through 180°. The rotation as intended can be indicated, for example, by a marking 26 which is arranged on a side of the emergency unlocking plug 20. Accordingly, the contact A 21 is connected to the contact C 22 in an electrically conducting manner, and the contact B 23 is connected to the contact E 25 in an electrically conducting manner, wherein the contact D 24 is electrically insulated from each of the other contacts present in the emergency unlocking plug-socket pair 18. By virtue of the fact that the contact E 25 closes an emergency unlocking current circuit with the SMA adjusting element 6, the latter assumes its hot shape, with the result that the locking device 1 is unlocked.

Figure 6:
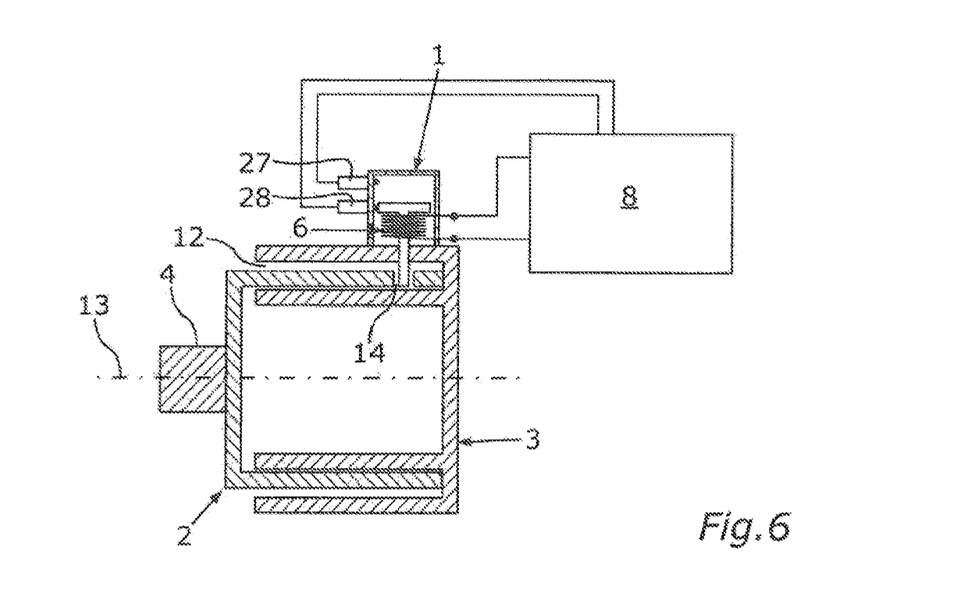
FIG. 6 is a schematic illustration showing a further embodiment of the locking device which has a sensor system for determining a state of the locking device.

FIG. 6 is a schematic illustration showing a further embodiment of the locking device, which has a sensing system for determining a state of the locking device. This means that, for example, a first position sensor 27 and a second position sensor 28 can be provided on the locking device 1, wherein for example the first position sensor 27 is assigned to the release position and the second position sensor 28 is assigned to the locking position. In other words, the first position sensor 27 can output a sensor value and transmit it for example to the control device 8 connected to the first position sensor 27 if the locking element 5 is arranged in the release position. Analogously, the second position sensor 28 can output a sensor value and transmit it for example to the control device 8 connected to the second position sensor 28 if the locking element 5 is arranged in the locking position. Alternatively or additionally, the control device 8 connected to the SMA adjusting element 6 and/or further SMA adjusting element 16 can be designed to measure an electrical resistance of the SMA adjusting element 6 and/or an electrical resistance of the SMA adjusting element 16 in order to determine, via the respective electrical resistance which is dependent on whether the respective SMA adjusting element has assumed its cold shape or hot shape, whether the locking element 5 is currently arranged in the release position or the locking position.

It is further contemplated that, instead of being designed as an SMA helical spring, the SMA adjusting element can be designed, for example, as an SMA cable pull. In addition to an SMA pull element which can be configured, in particular, as an SMA cable, the SMA cable pull can optionally have at least one deflection means configured, for example, as a deflection roller, with the result that the SMA cable pull can have a particularly compact design. It is further contemplated that the SMA cable pull is arranged in the charging plug 2, wherein the SMA pull element can be arranged at least substantially parallel to the charging cable 4, in particular in the charging cable 4.

The locking element 5 can be blocked in an undesirable manner in the locking position and release position as a result of a blockage, for example by an ice layer, a charging plug 2 inserted in a tilted manner into the charging socket 3 and/or other influences, with the result that the locking element 5 can be displaced only partially or not at all into the respective other position by the SMA adjusting element 6 and/or 15. This can mean that the locking element 5, in an incorrect position, can be arranged either completely in the locking position or completely in the release position. Nevertheless, the locking device remains undamaged even if the SMA adjusting element 6 and/or 15, which are designed in a preferred embodiment as SMA helical springs, are activated by means of the control device, that is to say energized and/or heated. This means that, for example, the SMA helical spring 6, with the locking element 5 undesirably blocked, can be activated by means of the control device 8, but a transition into the hot shape is prevented by a spatial limitation between the supporting portion 11 and a wall of the housing 10, with the result that the SMA helical spring 9 produces a mechanical stress between the wall of the housing 10 and the supporting portion 11. If the blockage is overcome, for example by a melting of the ice and/or by a regripping in which the charging plug 2 is ultimately correctly inserted into the charging socket 3, there occurs no further, i.e. renewed, activation of the locking device 1 by means of the control device 8. The locking element 5 is nevertheless displaceable from the incorrect position into the release position or from the incorrect position into the locking position or from the release position into the locking position or from the locking position into the release position in that the locking element 5 is displaceable into the respective other position by virtue of the mechanical stress which is present in the SMA helical spring 9 by the activation of the SMA helical spring 9. This means that, for a user who is confronted with a locking element 5 which is blocked and/or arranged in the incorrect position, a further operating step after the blockage has been overcome for adjusting the locking element 5 into the locking position or release position can be dispensed with. This is advantageous by contrast with conventional locking devices, since further devices, for example operating elements for a manual initiation of an adjusting operation, can be dispensed with. This is particularly intuitive for the user, and the locking device 1 can be realized in a particularly cost-efficient manner.

Figure 7:
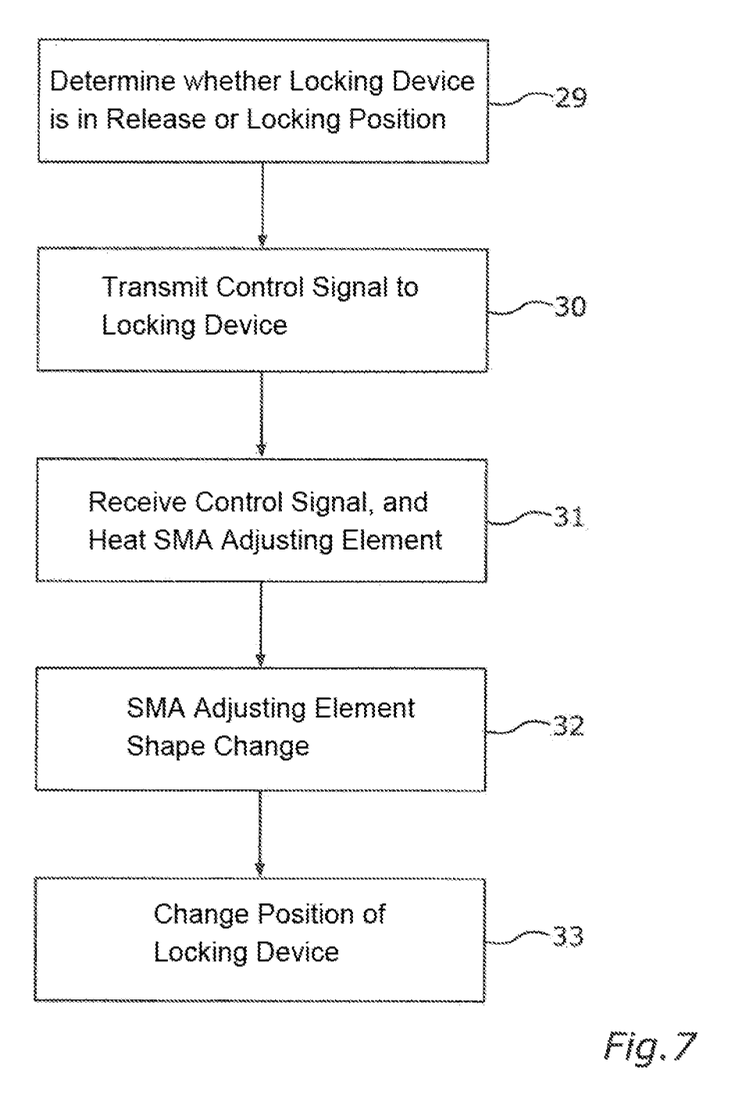
FIG. 7 is a flow diagram in which the steps of a method for operating a locking device described herein are illustrated.

FIG. 7 shows a flow diagram in which the steps of a method for operating a locking device described herein are illustrated. In a first step 29, there occurs a position determination in which the control device 8 establishes whether the locking element 5 is arranged in the release position or in the locking position. On the basis of the position determination, it is determined whether the SMA adjusting element 6 and/or the further SMA adjusting element 16 are activated in order to axially displace the locking element 5 along the longitudinal axis 7.

In a second step 30, the control device 8 transmits the control signal which is received by the locking device 1, in particular by the SMA adjusting element 6 and/or the further SMA adjusting element 16.

In a third step 31, the respective SMA adjusting element receives the control signal, which is formed, for example, as an electric current, with the result that the respective SMA adjusting element, i.e. the SMA adjusting element 6 or the further SMA adjusting element 16, is heated.

In a fourth step 32, the respective SMA adjusting element experiences, by virtue of its operating principle, a shape change from its cold shape into its hot shape, with the result that, for example, the SMA helical spring 9 is expanded axially along the longitudinal axis 7.

In a fifth step 33, the locking element 5, by virtue of the shape change of the SMA adjusting element 6 that occurred in the fourth step 32, is accordingly moved from the locking position into the release position or from the release position into the locking position, with the result that the charging plug 2 can be removed from the charging socket 3 or is locked.

LIST OF REFERENCE SIGNS

1 Locking device
2 Charging plug
3 Charging socket
4 Charging cable
5 Locking element
6 Shape memory alloy adjusting element or SMA adjusting element
7 Longitudinal axis
8 Control device
9 SMA helical spring
10 Housing
11 Supporting part
12 Plug-in region
13 Plug longitudinal axis
14 Locking receptacle
15 Further SMA adjusting element
16 Further SMA helical spring
17 Emergency unlocking device
18 Emergency unlocking plug-socket pair
19 Emergency unlocking socket
20 Emergency unlocking plug
21 Contact A
22 Contact B
23 Contact C
24 Contact D
25 Contact E
26 Marking
27 First position sensor
28 Second position sensor
29 First step
30 Second step
31 Third step
32 Fourth step
33 Fifth step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A locking device for an energy storage device of a car, the locking device comprising:
   a locking element;
   an adjusting device for adjusting the locking element, in response to a control signal, between a locking position in which the locking element is in engagement with a locking receptacle, and a release position in which the locking element is out of engagement with the locking receptacle; and
   a sensor system for determining a position of the locking element, wherein
   the adjusting device has an adjusting element made of a shape memory alloy,
   a shape change of the adjusting element adjusts the locking element between the locking position and the release position
   the sensor system comprises a measuring arrangement configured to measure an electrical resistance of the adjusting element, the electrical resistance being dependent on a shape of the adjusting element, and
   the sensor system is configured to output a first sensor value if the locking element is arranged in the locking position, and a second sensor value if the locking element is arranged in the release position.

2. The locking device according to claim 1, wherein
   in an inoperative state, the locking device holds the locking element stably in the release position by the adjusting element, and
   the locking element is adjustable into the locking position based on the control signal.

3. The locking device according to claim 1, wherein
   in the inoperative state, the locking device holds the locking element stably in the locking position by the adjusting element, and
   the locking element is adjustable into the release position based on the control signal.

4. The locking device according to claim 1, wherein
   in the inoperative state, the locking device holds the locking element bistably in the release position and/or in the locking position by the adjusting device, and
   the locking element is adjustable into the respective other position based on the control signal.

5. The locking device according to claim 1, further comprising:
   an electrical switching element provided on the locking device, by which the locking device is emergency-unlocked.

6. The locking device according to claim 1, wherein
   the locking device is provided for a plug connection of a charging plug with a charging socket of the energy storage device.

7. The locking device according to claim 6, wherein
   the locking receptacle is arranged in the charging plug, the locking element being arranged on the charging socket.

8. The locking device according to claim 7, wherein
   the locking element is pluggable into the locking receptacle if the charging plug is received in the charging socket in a completely plugged-in plugging position.

9. A method for operating a locking device for an energy storage device of a car, in which a locking element is adjusted, on the basis of a control signal, by an adjusting device, between a locking position, in which the locking element is in engagement with a locking receptacle, and a release position, in which the locking element is out of engagement with the locking receptacle, the method comprising:
   issuing a control signal;
   adjusting the locking element, based on the control signal, between the locking position and the release position by a shape change of an adjusting element of the adjusting device that has a shape memory alloy; and
   utilizing a sensor system to determine whether the locking element is in the locking position or the release position, wherein
   the step of utilizing the sensor system to determine the position of the locking element comprises measuring electrical resistance of the adjusting element by a control device, the electrical resistance being dependent on a shape of the adjusting element.

10. The locking device according to claim 1, wherein the sensor system further comprises:
    a first position sensor assigned to the locking position; and
    a second position sensor assigned to the release position.

11. The locking device according to claim 1, wherein the adjusting element comprises a helical spring.

12. The locking device according to claim 1, further comprising:
    an additional adjusting element comprising a shape memory alloy arranged coaxially with the adjusting element along a longitudinal axis of the locking element, wherein
    the adjusting element and the additional adjusting element comprise a bistable configuration, whereby their respective cold and/or hot shape is retained without activation and energy is expended only when displacement of the locking element is intended to take place.

13. The locking device according to claim 12, wherein the additional adjusting element comprises an additional helical spring.

14. The method of claim 9, wherein
    utilizing a sensor system to determine the position of the locking element further comprises:
    transmitting a sensor value output by a first position sensor to a control device if the locking element is arranged in the release position; and
    transmitting a sensor value output by a second position sensor to a control device if the locking element is arranged in the locking position.

* * * * *